United States Patent
Zhang

(10) Patent No.: US 11,138,041 B2
(45) Date of Patent: Oct. 5, 2021

(54) METHOD FOR AUTOMATICALLY RELEASING RESOURCE OCCUPIED BY PROCESS IN BACKGROUND OF TERMINAL, STORAGE MEDIUM AND TERMINAL

(71) Applicant: JRD Communication (Shenzhen) LTD., Shenzhen (CN)

(72) Inventor: Min Zhang, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 20 days.

(21) Appl. No.: 16/639,572

(22) PCT Filed: Aug. 16, 2018

(86) PCT No.: PCT/CN2018/100809
§ 371 (c)(1),
(2) Date: Feb. 16, 2020

(87) PCT Pub. No.: WO2019/034104
PCT Pub. Date: Feb. 21, 2019

(65) Prior Publication Data
US 2020/0241925 A1 Jul. 30, 2020

(30) Foreign Application Priority Data
Aug. 16, 2017 (CN) .......................... 201710700687.3

(51) Int. Cl.
*G06F 9/46* (2006.01)
*G06F 9/50* (2006.01)

(52) U.S. Cl.
CPC .................. *G06F 9/5022* (2013.01)

(58) Field of Classification Search
CPC .................................................. G06F 9/5022
See application file for complete search history.

(56) References Cited

U.S. PATENT DOCUMENTS 10,788,881 B2   9/2020 Yang

FOREIGN PATENT DOCUMENTS

| CN | 103324500 | 9/2013 |
|---|---|---|
| CN | 104199731 | 12/2014 |

(Continued)

OTHER PUBLICATIONS

International Search Report and the Written Opinion dated Nov. 5, 2018 From the International Searching Authority Re. Application No. PCT/CN2018/100809 and Its Translation of Search Report Into English. (9 Pages).

(Continued)

*Primary Examiner* — Gregory A Kessler

(57) ABSTRACT

A method for automatically releasing a resource occupied by a process in a background of a terminal is provided. The method includes: determining whether the process is in a cache state when the process is transferred to the background; releasing a hardware resource in a system occupied by the process automatically if yes; determining whether the process is in a running state if no; maintaining a current state if no; determining whether a maintaining time of the running state reaches an upper limit of a preset time threshold value if yes; releasing the hardware resource in the system occupied by the process automatically if yes; maintaining the current state if no. A storage medium and a terminal are also provided.

20 Claims, 5 Drawing Sheets

---

S100 — It is determined whether the process is in a cache state when the process is transferred to the background. If yes, a hardware resource in a system of the mobile terminal occupied by the process is released automatically. If no, step S200 is performed.

S200 — It is determined whether the process is in a running state. If yes, step S300 is performed. If no, a current state maintains.

S300 — It is determined whether a maintaining time of the running state reaches an upper limit of a preset time threshold value. If yes, the hardware resource in the system occupied by the process is released automatically. If no, the current state maintains.

(56) References Cited

FOREIGN PATENT DOCUMENTS

| | | |
|---|---|---|
| CN | 105468426 | 4/2016 |
| CN | 107544847 | 1/2018 |
| WO | WO 2015/131679 | 9/2015 |
| WO | WO 2017/070894 | 5/2017 |
| WO | WO 2019/034104 | 2/2019 |

OTHER PUBLICATIONS

Supplementary European Search Report and the European Search Opinion dated Jun. 29, 2021 From the European Patent Office Re. Application No. 18845751.9. (11 Pages).

Vimal et al. "A Memory Management Scheme for Enhancing Performance of Applications on Android", 2015 IEEE Recent Advances in Intelligent Computational Systems (RAICS), XP032910859, Trivandrum, India, Dec. 10-12, 2015, p. 162-166, Dec. 10, 2015.

All or a part of monitoring of the hardware resource to which the process registers is closed, when the process is transferred to the background and it is determined that the process is in the cache state. ⟵ S101

Jumping to the next step, when the process is transferred to the background and it is determined that the process is not in the cache state. ⟵ S102

METHOD FOR AUTOMATICALLY RELEASING RESOURCE OCCUPIED BY PROCESS IN BACKGROUND OF TERMINAL, STORAGE MEDIUM AND TERMINAL

RELATED APPLICATIONS

This application is a National Phase of PCT Patent Application No PCT/CN2018/100809 having International filing date of Aug. 16, 2018, which claims the benefit of priority of Chinese Patent Application No. 201710700687.3 filed on Aug. 16, 2017. The contents of the above applications are all incorporated by reference as if fully set forth herein in their entirety.

FIELD AND BACKGROUND OF THE INVENTION

The present disclosure relates to a technology field of processes in backgrounds of mobile terminals, and more particularly to a method for automatically releasing a resource occupied by a process in a background of a terminal, a storage medium, and a terminal.

In production and life, when people use terminals (such as mobile phones or tablet computers), they will observe that many applications which are not used consume high power. In processes of applications in a background in a current system of a terminal, process levels are adjusted according to a system setting rule. Taking an Android system for example, the processes in the background are divided into several states including home APP, service A, service B, and cache according to the states of the processes in the background. Accordingly, it is necessary to consider power consumption condition of the processes in the states. Although the system can adjust CPU occupancy of each of the processes according to the different states of the processes, the system cannot release some hardware resources occupied by the processes at the same time. For example, the hardware resources in the system occupied by the processes of the service B and the cache are items which have high power consumption in the terminal, and thus the power consumption of the entire system may be high.

Consequently, the prior art needs to be improved.

SUMMARY OF THE INVENTION

Embodiments of the present disclosure provide a method for automatically releasing a resource occupied by a process in a background of a terminal, a storage medium, and a terminal capable of automatically releasing a hardware resource in a system occupied by the process in the background by determining results, thereby achieving an objective of saving power consumption.

In a first aspect, an embodiment of the present disclosure provides a method for automatically releasing a resource occupied by a process in a background of a terminal, wherein the method includes steps of:

determining whether the process is in a cache state when the process is transferred to the background; releasing a hardware resource in a system occupied by the process automatically if yes;

determining whether the process is in a running state if no; maintaining a current state if no;

determining whether a maintaining time of the running state reaches an upper limit of a preset time threshold value if yes; releasing the hardware resource in the system occupied by the process automatically if yes; maintaining the current state if no.

In the method for automatically releasing the resource occupied by the process in the background of the terminal, wherein the step of determining whether the process is in the cache state when the process is transferred to the background and the step of releasing the hardware resource in the system occupied by the process automatically if yes specifically include:

closing all or a part of monitoring of the hardware resource to which the process registers, when the process is transferred to the background and it is determined that the process is in the cache state; and jumping to the step of determining whether the process is in the running state, when the process is transferred to the background and it is determined that the process is not in the cache state.

In the method for automatically releasing the resource occupied by the process in the background of the terminal, wherein the process includes:

a wakelock, BLUETOOTH, GPS monitor, or WiFi.

In the method for automatically releasing the resource occupied by the process in the background of the terminal, wherein the step of determining whether the process is in the running state and the step of maintaining the current state if no specifically include:

jumping to the step of determining whether the maintaining time of the running state reaches the upper limit of the preset time threshold value, when it is determined that the process is in the running state; and maintaining the current state, when it is determined that the process is not in the running state.

In the method for automatically releasing the resource occupied by the process in the background of the terminal, wherein the step of determining whether the maintaining time of the running state reaches the upper limit of the preset time threshold value, the step of releasing the hardware resource in the system occupied by the process automatically if yes, and the step of maintaining the current state if no specifically include:

releasing the hardware resource in the system occupied by the process automatically, when it is determined that the maintaining time of the running state reaches the upper limit of the preset time threshold value; and maintaining the current state, when it is determined that the maintaining time of the running state does not reach the upper limit of the preset time threshold value.

In the method for automatically releasing the resource occupied by the process in the background of the terminal, wherein the upper limit of the preset time threshold value is set manually or automatically.

In the method for automatically releasing the resource occupied by the process in the background of the terminal, wherein the upper limit of the preset time threshold value is ranged from 10 minutes to 60 minutes.

In a second aspect, an embodiment of the present disclosure provides a storage medium, wherein the storage medium is configured to store computer programs, and the computer programs are executed to implement steps of:

determining whether the process is in a cache state when the process is transferred to the background; releasing a hardware resource in a system occupied by the process automatically if yes;

determining whether the process is in a running state if no; maintaining a current state if no;

determining whether a maintaining time of the running state reaches an upper limit of a preset time threshold value if yes; releasing the hardware resource in the system occupied by the process automatically if yes; maintaining the current state if no.

In the storage medium, wherein the step of determining whether the process is in the cache state when the process is transferred to the background and the step of releasing the hardware resource in the system occupied by the process automatically if yes specifically include:

closing all or a part of monitoring of the hardware resource to which the process registers, when the process is transferred to the background and it is determined that the process is in the cache state; and jumping to the step of determining whether the process is in the running state, when the process is transferred to the background and it is determined that the process is not in the cache state.

In the storage medium, wherein the process includes a wakelock, BLUETOOTH, GPS monitor, or WiFi.

In the storage medium, wherein the step of determining whether the process is in the running state and the step of maintaining the current state if no specifically include:

jumping to the step of determining whether the maintaining time of the running state reaches the upper limit of the preset time threshold value, when it is determined that the process is in the running state; and maintaining the current state, when it is determined that the process is not in the running state.

In the storage medium, wherein the step of determining whether the maintaining time of the running state reaches the upper limit of the preset time threshold value, the step of releasing the hardware resource in the system occupied by the process automatically if yes, and the step of maintaining the current state if no specifically include:

releasing the hardware resource in the system occupied by the process automatically, when it is determined that the maintaining time of the running state reaches the upper limit of the preset time threshold value; and maintaining the current state, when it is determined that the maintaining time of the running state does not reach the upper limit of the preset time threshold value.

In the storage medium, wherein the upper limit of the preset time threshold value is set manually or automatically.

In the storage medium, wherein the upper limit of the preset time threshold value is ranged from 10 minutes to 60 minutes.

In a third aspect, an embodiment of the present disclosure provides a terminal, including: a processor and a memory communicating with and connected to the processor, wherein the memory is configured to store computer programs, and the processor is configured to call the computer programs in the memory to execute steps of:

determining whether the process is in a cache state when the process is transferred to the background; releasing a hardware resource in a system occupied by the process automatically if yes;

determining whether the process is in a running state if no; maintaining a current state if no;

determining whether a maintaining time of the running state reaches an upper limit of a preset time threshold value if yes; releasing the hardware resource in the system occupied by the process automatically if yes; maintaining the current state if no.

In the terminal, wherein the step of determining whether the process is in the cache state when the process is transferred to the background and the step of releasing the hardware resource in the system occupied by the process automatically if yes specifically include:

closing all or a part of monitoring of the hardware resource to which the process registers, when the process is transferred to the background and it is determined that the process is in the cache state; and jumping to the step of determining whether the process is in the running state, when the process is transferred to the background and it is determined that the process is not in the cache state.

In the mobile terminal, wherein the process includes a wakelock, BLUETOOTH, GPS monitor, or WiFi.

In the terminal, the step of determining whether the process is in the running state and the step of maintaining the current state if no specifically include:

jumping to the step of determining whether the maintaining time of the running state reaches the upper limit of the preset time threshold value, when it is determined that the process is in the running state; and maintaining the current state, when it is determined that the process is not in the running state.

In the terminal, wherein the step of determining whether the maintaining time of the running state reaches the upper limit of the preset time threshold value, the step of releasing the hardware resource in the system occupied by the process automatically if yes, and the step of maintaining the current state if no specifically include:

releasing the hardware resource in the system occupied by the process automatically, when it is determined that the maintaining time of the running state reaches the upper limit of the preset time threshold value; and maintaining the current state, when it is determined that the maintaining time of the running state does not reach the upper limit of the preset time threshold value.

In the terminal, wherein the upper limit of the preset time threshold value is set manually or automatically.

Advantageous effect is described as follows. The present disclosure provides the method for automatically releasing the resource occupied by the process in the background of the terminal, the storage medium, and the terminal. The method includes: A, determining whether a process is in a cache state when the process is transferred to a background; if yes, a hardware resource in a system occupied by the process is released automatically; if no, step B is performed; B, determining whether the process is in a running state; if yes, step C is performed; if no, a current state maintains; C, determining whether a maintaining time of the running state reaches an upper limit of a preset time threshold value; if yes, the hardware resource in the system occupied by the process is released automatically; if no, the current state maintains. The present disclosure releases the hardware resource in the system occupied by the process in the background automatically after the terminal detects that the process is transferred to the background and it is determined that the process meets the condition, thereby achieving the objective of saving power consumption.

DESCRIPTION OF SPECIFIC EMBODIMENTS
OF THE INVENTION

To make the objectives, technical schemes, and technical effect of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Figure 1:
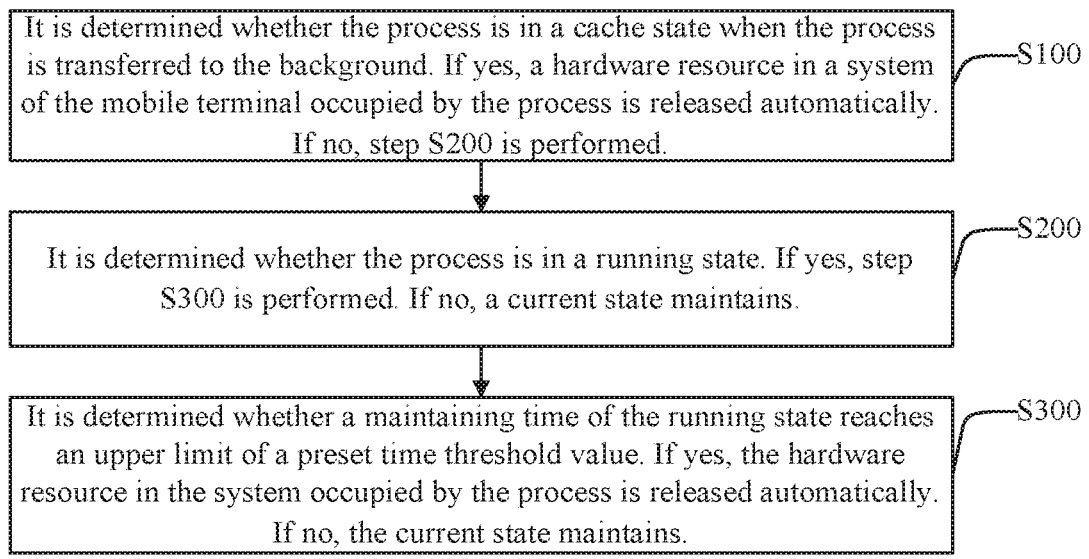
FIG. 1 illustrates a flow chart of a method for automatically releasing a resource occupied by a process in a background of a terminal in accordance with a preferred embodiment of the present disclosure.

Please refer to FIG. 1. FIG. 1 illustrates a flow chart of a method for automatically releasing a resource occupied by a process in a background of a terminal in accordance with a preferred embodiment of the present disclosure. As shown in FIG. 1, the method includes the following steps.

In step S100, it is determined whether the process is in a cache state when the process is transferred to the background. If yes, a hardware resource in a system of the mobile terminal occupied by the process is released automatically. If no, step S200 is performed.

In step S200, it is determined whether the process is in a running state. If yes, step S300 is performed. If no, a current state maintains.

In step S300, it is determined whether a maintaining time of the running state reaches an upper limit of a preset time threshold value. If yes, the hardware resource in the system occupied by the process is released automatically. If no, the current state maintains.

The process includes a wakelock, BLUETOOTH, GPS monitor, or WiFi.

It is noted that the service B is a state of a process in an Android system. This process does not have a foreground interface, and a service in the process does not relate to any foreground interface. The cache state is also a state of a process in the Android system. This process does not have a foreground interface and does not include any service. By determining the processes of the service B and the cache state, the hardware resources in the system occupied by the processes (e.g., the occupied GPS monitor or the wakelock) can be released automatically, thereby achieving an objective of saving power consumption of the terminal (e.g., a mobile phone or a tablet computer.).

In a specific implementation, it is necessary to determine the state of the process before step S100 first. When the terminal detects that the process is transferred to the background, the state of the current process is determined. Then, it is determined whether the process is in the cache state. If yes, the hardware resource in the system occupied by the process is released automatically. If no, step S200 is performed. Step S200 is configured to determine whether the state of the current process is suitable for releasing the occupied hardware resource in the system automatically, that is, to determine whether the process is in the running state. If yes, step S300 is performed. If no, the current state maintains. That is, when the current process is not in the running state, the current state maintains. When the current process is in the running state, step S300 is performed. Step S300 is configured to determine whether the maintaining time of the running state reaches the upper limit of the preset time threshold value. If yes, the hardware resource in the system occupied by the process is released automatically. If no, the current state maintains.

It can be appreciated that when the process is transferred to the background, the process is in the cache state and the maintaining time of the running state reaches the upper limit of the preset time threshold value, the hardware resource in the system occupied by the process is released automatically. As such, the hardware resource in the system is saved, and the power consumption is also saved.

Figures 2, 3:
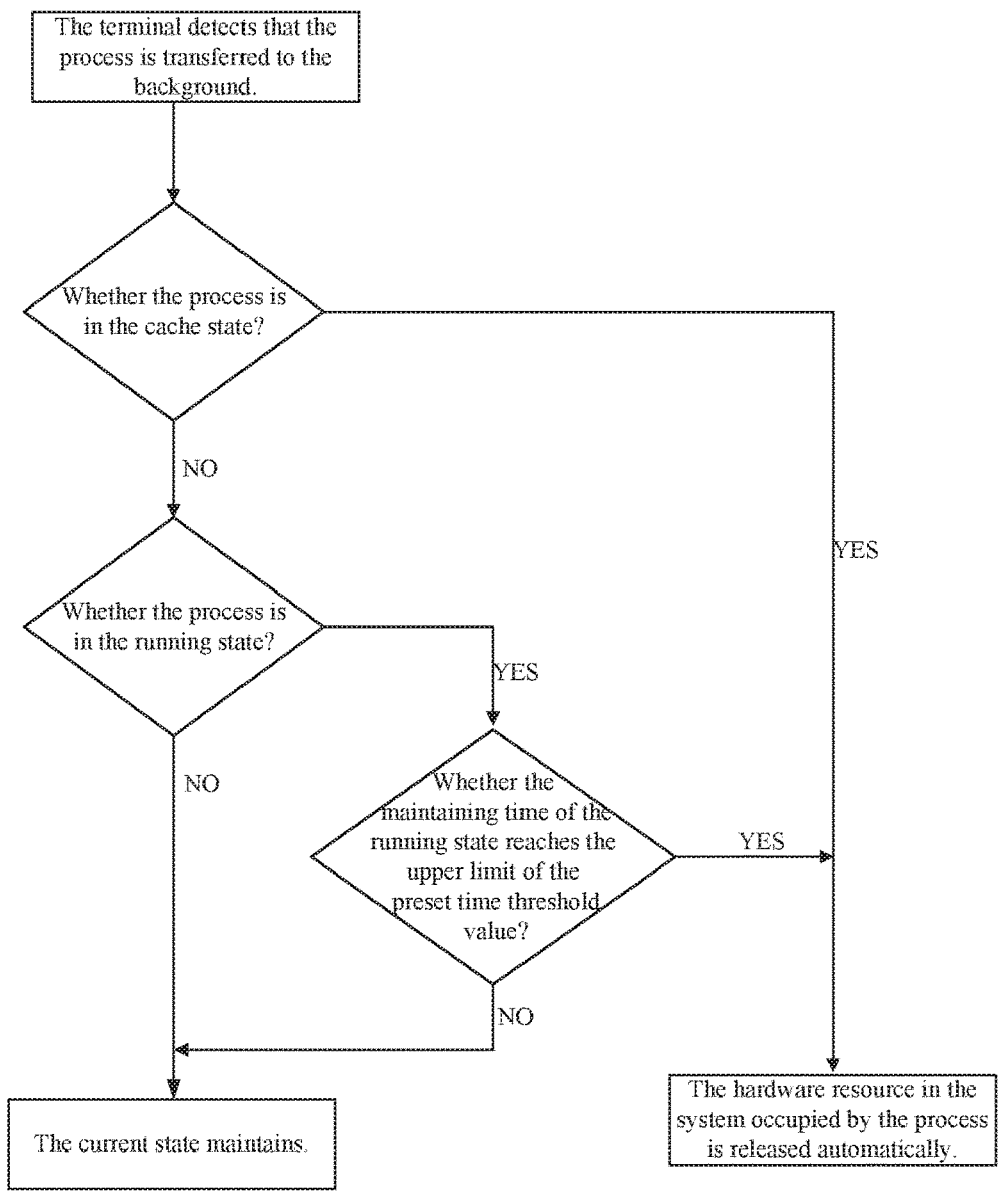
FIG. 2 illustrates a logical flow chart of the method for automatically releasing the resource occupied by the process in the background of the terminal in accordance with a preferred embodiment of the present disclosure.
FIG. 3 illustrates an operational flow chart of determining a state of the process in the method for automatically releasing the resource occupied by the process in the background of the terminal in accordance with a preferred embodiment of the present disclosure.

Further, to understand the method for automatically releasing the resource occupied by the process in the background of the terminal in accordance with the present disclosure more clearly, a logical flow chart is further explained as follows. As shown in FIG. 2, FIG. 2 illustrates a logical flow chart of the method for automatically releasing the resource occupied by the process in the background of the terminal in accordance with a preferred embodiment of the present disclosure. It is determined whether the process is in a cache state when the process is transferred to the background. If yes, a hardware resource in a system of the terminal occupied by the process is released automatically. When the process is not in the cache state, it is further determined whether the process is in a running state. When the process is not in the running state, a current state maintains. When the process is in the running state, it is further determined whether a maintaining time of the running state reaches an upper limit of a preset time threshold value. When the maintaining time of the running state does not reach the upper limit of the preset time threshold value, the current state maintains. When the maintaining time of the running state reaches the upper limit of the preset time threshold value, the hardware resource in the system occupied by the process is released automatically.

It can be appreciated from the present disclosure that when the process is in the cache state or a low level state, the hardware resource occupied by the process can be limited. Accordingly, all embedded systems can adopt the method of the present disclosure as long as condition settings are added. That is, the method for automatically releasing the resource occupied by the process in the background of the terminal in accordance with the present disclosure has a wide generality.

Further, as shown in FIG. 3, step S100 specifically includes the following steps.

In step S101, all or a part of monitoring of the hardware resource to which the process registers is closed, when the process is transferred to the background and it is determined that the process is in the cache state.

In step S102, jumping to the next step, when the process is transferred to the background and it is determined that the process is not in the cache state.

In a specific implementation, the terminal determines the state of the process first. When it is determined that the process is transferred to the background, it is determined whether the process is in the cache state. When it is determined that the process is in the cache state, all or the part of monitoring of the hardware resource to which the process registers is closed. If it is determined that the process is not in the cache state, jumping to step S200.

It can be appreciated that the objectives of saving the hardware resource and saving the power consumption can be achieved by determining whether the process is in the cache state to close all or the part of monitoring of the hardware resource to which the process registers.

Figure 4:
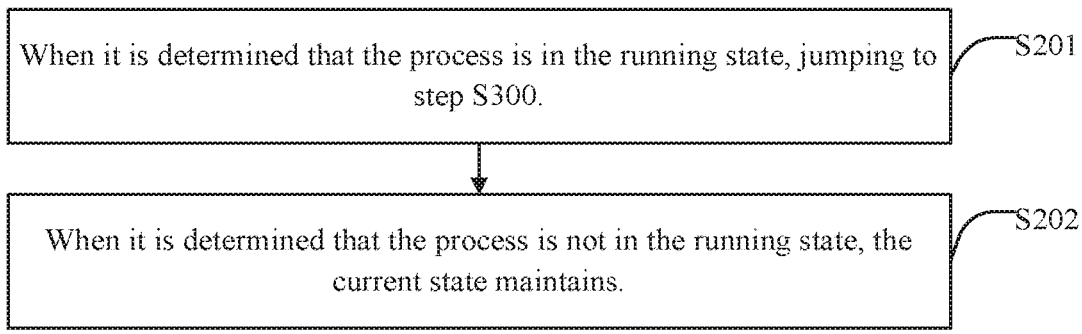
FIG. 4 illustrates an operational flow chart of determining a running state in the method for automatically releasing the resource occupied by the process in the background of the terminal in accordance with a preferred embodiment of the present disclosure.

Further, as shown in FIG. 4, step S200 specifically includes the following steps.

In step S201, when it is determined that the process is in the running state, jumping to step S300.

In step S202, when it is determined that the process is not in the running state, the current state maintains.

In a specific implementation, the terminal determines the state of the process first in accordance with a preferred embodiment of the present disclosure. When it is determined that the process is transferred to the background, it is determined whether the process is in the cache state. When it is determined that the process is not in the cache state, it is further determined whether the process is in the running state. When it is determined that the process is not in the running state, no action is performed and the current state maintains. When it is determined that the process is in the running state, it is further determined the maintaining time of the running state.

Figure 5:
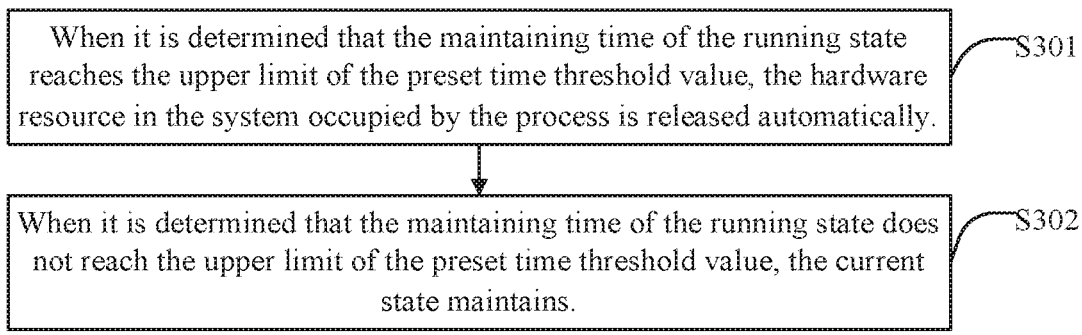
FIG. 5 illustrates an operational flow chart of determining a maintaining time of the running state in the method for automatically releasing the resource occupied by the process in the background of the terminal in accordance with a preferred embodiment of the present disclosure.

In a further embodiment as shown in FIG. 5, step S300 specifically includes the following steps.

In step S301, when it is determined that the maintaining time of the running state reaches the upper limit of the preset time threshold value, the hardware resource in the system occupied by the process is released automatically.

In step S302, when it is determined that the maintaining time of the running state does not reach the upper limit of the preset time threshold value, the current state maintains.

In a specific implementation, when it is determined that the process is in the running state, it is further determined the maintaining time of the running state. When it is determined that the maintaining time of the running state reaches the upper limit of the preset time threshold value, the hardware resource in the system occupied by the process is released automatically. When it is determined that the maintaining time of the running state does not reach the upper limit of the preset time threshold value, the current state maintains. The upper limit of the preset time threshold value may be set manually or automatically. The upper limit of the preset time threshold value is ranged from 10 minutes to 60 minutes. Preferably, the upper limit of the preset time threshold value is 30 minutes.

Figure 6:
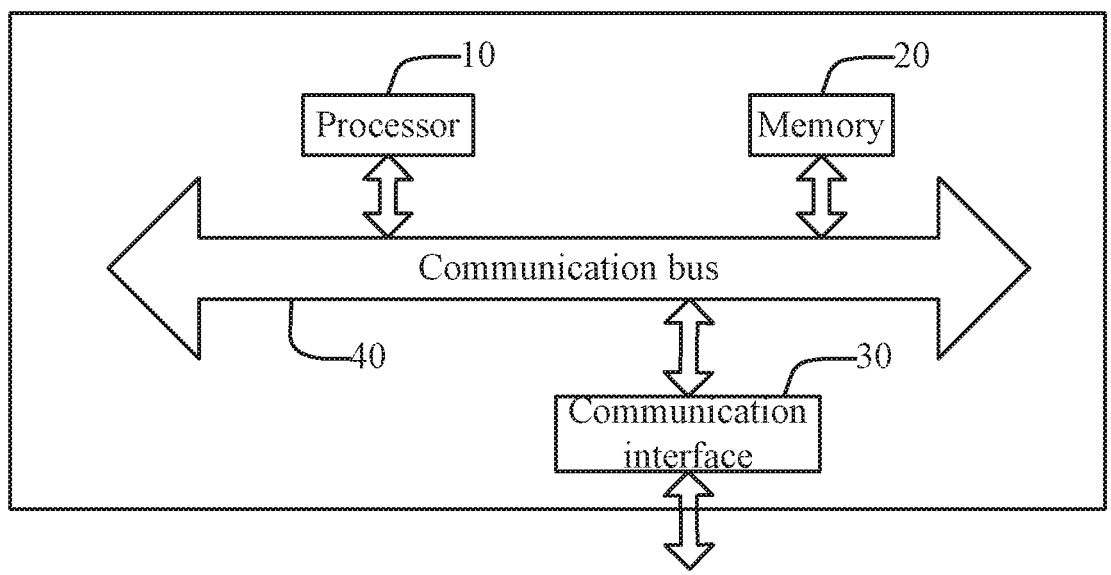
FIG. 6 illustrates a functional block diagram in accordance with the present disclosure.

The present disclosure further provides a terminal. As shown in FIG. 6, the terminal includes a processor 10, a memory 20, a communication interface 30, and a communication bus 40.

The processor 10, the memory 20, and the communication interface 30 implement communications thereamong via the communication bus 40.

The communication interface 30 is configured to implement information transmission between the terminal and a communication device.

The processor is configured to call computer programs in the memory 20 to execute the method provided by the above-mentioned embodiments. For example, the method includes: A, determining whether a process is in a cache state when the process is transferred to a background; if yes, a hardware resource in a system occupied by the process is released automatically; if no, step B is performed; B, determining whether the process is in a running state; if yes, step C is performed; if no, a current state maintains; C, determining whether a maintaining time of the running state reaches an upper limit of a preset time threshold value; if yes, the hardware resource in the system occupied by the process is released automatically; if no, the current state maintains.

An embodiment of the present disclosure further provides a storage medium. The storage medium is configured to store computer programs. The computer programs can be executed to implement the method for automatically releasing the resource occupied by the process in the background of the terminal.

Figure 7:
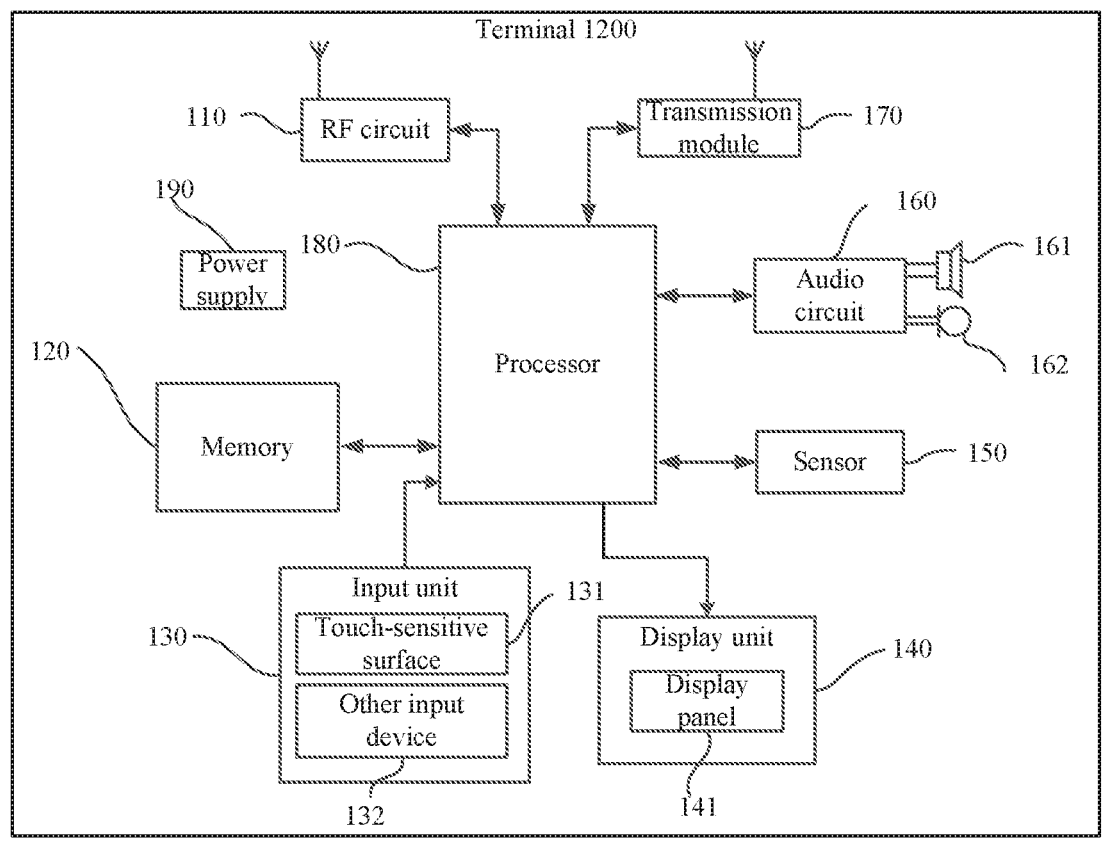
FIG. 7 illustrates a structural diagram of a terminal in accordance with an embodiment of the present disclosure.

FIG. 7 illustrates a block diagram of a mobile terminal in accordance with an embodiment of the present disclosure. The mobile terminal may be used to implement the method for automatically releasing the resource occupied by the process in the background of the terminal provided by the above-mentioned embodiment. The mobile terminal 1200 may be a smart phone or a tablet computer.

As shown in FIG. 7, the mobile terminal 1200 may include a radio frequency (RF) circuit 110, a memory 120 including one or more computer readable storage mediums (only one is shown in FIG. 7), an input unit 130, a display unit 140, at least one sensor 150, an audio circuit 160, a transmission module 170, a processor 180 including one or more processing cores (only one is shown in FIG. 7), a power supply 190 and the like. Those skilled in the art can understand that the mobile terminal 1200 is not limited to the structure shown in FIG. 7, and may include more or fewer parts than those shown in FIG. 7, or some parts may be combined, or different arrangement of parts may be adopted.

The RF circuit 110 is configured to receive and transmit electromagnetic waves and to realize conversions of the electromagnetic waves and electrical signals, thereby communicating with a communication network or any other device. The RF circuit may include various conventional circuit elements used for performing these functions, for example, an antenna, a radio frequency transmitter, a digital signal processor, an encryption/decryption chip, a subscriber identification module (SIM) card, a memory and the like. The RF circuit 110 may communicate with various networks, for example, an internet, an intranet or a wireless network, or may communicate with any other device via a wireless network. The above-mentioned wireless network may include a cellular telephone network, a wireless local area network or a metropolitan area network. The above-mentioned wireless network may use various communication standards, protocols and technologies and may include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP) Worldwide Interoperability for Microwave Access (Wi-Max), other protocols for E-mail, instant messaging and Short Messaging Service (SMS) and other suitable communication protocols, and may include protocols which are not developed currently.

The memory 120 may be configured to store software programs and software modules, for example, the program instructions/modules corresponding to the method for automatically releasing the resource occupied by the process in the background of the terminal in accordance with the above-mentioned embodiments. The processor 180 executes various functional applications and data processing (that is, implements the function of automatically releasing the resource occupied by the process in the background of the terminal) by operating the software programs and the software modules stored in the memory 120. The memory 120 may include a high speed random access memory and also may include a non-volatile memory, such as one or more disk storage devices, a flash memory device or other non-volatile solid storage devices. In some embodiments, the memory 120 may further include a remote memory disposed corresponding to the processor 180. The remote memory may be connected to the mobile terminal 1200 via a network. Examples of the network include but are not limited to an internet, an intranet, a local area network, a mobile communication network and the combinations of them.

The input unit 130 may be configured to receive input number or character information and to generate keyboard, mouse, joystick, optical or trajectory ball signal inputs related to a user's setting and functional control. In detail, the input unit 130 may include a touch-sensitive surface 131 and other input device 132. The touch-sensitive surface 131, also called a touch display screen or a touch panel, may be configured to detect touch operations of a user on or near the touch-sensitive surface 131 (for example, operations carried out by the user through any suitable objects or attachments, such as a finger, a touch pen and the like, on the touch-sensitive surface 131 or near the touch-sensitive surface 131) and to drive a corresponding device connected therewith according to a preset program. Optionally, the touch-sensitive surface 131 may include a touch detection device and a touch controller. The touch detection device detects the touch direction of the user, detects a signal caused by the touch operation and transmits the signal to the touch controller. The touch controller receives touch information from the touch detection device, converts the touch information into a contact coordinate and then transmits the contact coordinate to the processor 180 and may receive a command transmitted by the processor 180 and execute the command. Moreover, the touch-sensitive surface 131 may be one of various types, such as a resistance type, a capacitance type, an infrared type, a surface acoustic wave type and the like. Besides the touch-sensitive surface 131, the input unit 130 also may include other input device 132. In detail, other input device 132 may include, but is not limited to, one or more of a physical keyboard, function keys (such as a volume control key, a switching key and the like), a trackball, a mouse, a joystick and the like.

The display unit 140 may be configured to display information input by the user or information provided for the user and various graphical user interfaces of the mobile terminal 1200. The graphical user interfaces may be constituted by graphics, texts, icons, videos and any combinations of them. The display unit 140 may include a display panel 141. Optionally, the display panel 141 may be configured in forms of a Liquid Crystal Display (LCD), an Organic Light-Emitting Diode (OLED) and the like. Furthermore, the touch panel 131 may cover the display panel 141. When the touch-sensitive surface 131 detects a touch operation on or near it, the signal caused by the touch operation is transmitted to the processor 180 to determine the type of a touch event. Then, the processor 180 provides a corresponding visual output on the display panel 141 according to the type of the touch event. In FIG. 7, the touch-sensitive surface and the display panel 141 are served as two independent parts for accomplishing input and output functions, however, in some embodiments, the touch-sensitive surface 131 and the display panel 141 may be integrated to accomplish the input and output functions.

The mobile terminal 1200 may further include at least one sensor 150, such as a gyroscope sensor, a magnetic induction sensor, an optical sensor, a motion sensor and other sensors. In detail, the optical sensor may include an environmental light sensor and a proximity sensor. The environmental light sensor may adjust brightness of the display panel 141 according to the lightness of environmental light. The proximity sensor may turn off the display panel 141 and/or backlight when the mobile terminal 1200 approaches an ear. As one type of the motion sensor, an accelerometer sensor may detect the value of an acceleration in each direction (generally in three axial directions), may detect the value and the direction of gravity in a static state, which may be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors may be integrated into the mobile terminal 1200, and explanations are not repeated herein.

The audio circuit 160, a speaker 161 and a microphone 162 may provide an audio interface between the user and the mobile terminal 1200. The audio circuit 160 may transmit an electric signal obtained by converting received audio data to the speaker 161. The electric signal is converted into a sound signal to be outputted by the speaker 161. On the other hand, the microphone 162 converts a collected sound signal into an electric signal. The audio circuit 160 receives the electric signal and converts the electric signal into audio data. After the audio data is outputted to the processor 180 and is processed, it is transmitted, for example, to another terminal through the RF circuit 110, or is outputted to the memory 120 in order to be further processed. The audio circuit 160 may further include an ear plug hole for providing communication between an external ear phone and the mobile terminal 1200.

The mobile terminal 1200 can help the user to receive and send E-mails, browse webpages, access streaming media and the like by the transmission module 170 (for example, a Wi-Fi module). The transmission module 170 provides wireless broadband internet access for the user. Although the transmission module 170 is shown in FIG. 7, it should be understood that the transmission module 170 is not the necessary part of the mobile terminal 1200 and may completely be omitted as required without changing the scope of the present disclosure.

The processor 180 is a control center of the mobile terminal 1200, is connected with all the parts of the whole mobile phone by various interfaces and lines and is configured to execute various functions of the mobile terminal 1200 and process the data by operating the software programs and/or the modules stored in the memory 120, and to call the data stored in the memory 120 so as to carry out integral monitoring on the mobile phone. Optionally, the processor 180 may include one or more processing cores. In some embodiments, the processor 180 may be integrated with an application processor and a modulation/demodulation processor. The application processor is mainly configured to process an operating system, at least one user interface, at least one application and the like. The modulation/demodulation processor is mainly configured to process wireless communication. It should be understood that the modulation/demodulation processor may also be not integrated into the processor 180.

The mobile terminal 1200 further includes the power supply 190 (such as a battery) for supplying power to each part. In some embodiments, the power supply may be logically connected with the processor 180 by a power supply management system, so as to implement functions of charge management, discharge management, power consumption management and the like by the power supply management system. The power supply 190 may further include one or more direct current or alternating current power supplies, recharging systems, power supply failure detection circuits, power converters or inverters, power supply status indicators and the like.

Although not shown in the FIG. 7, the mobile terminal 1200 may further include a camera (for example, a front camera or a rear camera), a BLUETOOTH module, and the like which are not further described herein. In the present embodiment, the display unit of the mobile terminal is a touch screen display, and the mobile terminal further includes a memory and one or more programs. The one or more programs are stored in the memory and configured to be executed by one or more processors. The one or more programs contain instructions for performing the following operations:

determining whether a process is in a cache state when the process is transferred to a background; releasing a hardware resource in a system occupied by the process automatically if yes;

determining whether the process is in a running state if no; maintaining a current state if no;

determining whether a maintaining time of the running state reaches an upper limit of a preset time threshold value if yes; releasing the hardware resource in the system occupied by the process automatically if yes; maintaining the current state if no.

When the terminal detects that the process is transferred to the background, it is determined whether the process is in the cache state. The step of releasing the hardware resource in the system occupied by the process automatically if yes specifically includes:

closing all or a part of monitoring of the hardware resource to which the process registers, when the process is transferred to the background and it is determined that the process is in the cache state; and jumping to the step of determining whether the process is in the running state, when the process is transferred to the background and it is determined that the process is not in the cache state.

The process includes a wakelock, BLUETOOTH, GPS monitor, or WiFi.

The step of determining whether the process is in the running state and the step of maintaining the current state if no specifically include:

jumping to the step of determining whether the maintaining time of the running state reaches the upper limit of the preset time threshold value, when it is determined that the process is in the running state; and maintaining the current state, when it is determined that the process is not in the running state.

The step of determining whether the maintaining time of the running state reaches the upper limit of the preset time threshold value, the step of releasing the hardware resource in the system occupied by the process automatically if yes, and the step of maintaining the current state if no specifically include:

releasing the hardware resource in the system occupied by the process automatically, when it is determined that the maintaining time of the running state reaches the upper limit of the preset time threshold value; and maintaining the current state, when it is determined that the maintaining time of the running state does not reach the upper limit of the preset time threshold value.

The upper limit of the preset time threshold value may be set manually or automatically.

In summary, the present disclosure provides the method for automatically releasing the resource occupied by the process in the background of the terminal, the storage medium, and the terminal. The method includes: A, determining whether a process is in a cache state when the process is transferred to a background; if yes, a hardware resource in a system occupied by the process is released automatically; if no, step B is performed; B, determining whether the process is in a running state; if yes, step C is performed; if no, a current state maintains; C, determining whether a maintaining time of the running state reaches an upper limit of a preset time threshold value; if yes, the hardware resource in the system occupied by the process is released automatically; if no, the current state maintains. The present disclosure releases the hardware resource in the system occupied by the process in the background automatically after the terminal detects that the process is transferred to the background and it is determined that the process meets the condition, thereby achieving the objective of saving power consumption.

It should be noted that those skilled in the art may understand all or some of the processes in the methods of the embodiments described above can be realized by using programs to instruct corresponding hardware (e.g., a processor, a controller and so on). The programs may be stored in a computer readable storage medium. The storage medium may include read-only memory (ROM), random access memory (RAM), disk, compact disc (CD), or the like.

It should be understood that present disclosure is not limited to the exemplary examples. Those skilled in the art in the art may achieve equivalent improvements or replacements according to the above description. The equivalent improvements and replacements should be considered to belong to the protection scope of the present disclosure.

What is claimed is:

1. A method for automatically releasing a resource occupied by a process in a background of a terminal, wherein the method comprises steps of:

determining whether the process is in a cache state when the process is transferred to the background;

releasing a hardware resource occupied by the process automatically if the process is in the cache state, wherein the hardware resource is in a system of the terminal;

determining whether the process is in a running state if the process is not in the cache state;

maintaining a current state if the process is not in the running state;

determining whether a maintaining time of the running state reaches an upper limit of a preset time threshold value if the process is in the running state;

releasing the hardware resource occupied by the process automatically if the maintaining time of the running state reaches the upper limit of the preset time threshold value; and maintaining the current state if the maintaining time of the running state does not reach the upper limit of the preset time threshold value.

2. The method for automatically releasing the resource occupied by the process in the background of the terminal of claim 1, wherein the step of releasing the hardware resource occupied by the process automatically if the process is in the cache state comprises:
closing all or a part of monitoring of the hardware resource to which the process registers.

3. The method for automatically releasing the resource occupied by the process in the background of the terminal of claim 2, wherein the process comprises a wakelock, BLUETOOTH, GPS monitor, or WiFi.

4. The method for automatically releasing the resource occupied by the process in the background of the terminal of claim 1, wherein the step of determining whether the process is in the running state comprises:
jumping to the step of determining whether the maintaining time of the running state reaches the upper limit of the preset time threshold value, when it is determined that the process is in the running state; and
maintaining the current state, when it is determined that the process is not in the running state.

5. The method for automatically releasing the resource occupied by the process in the background of the terminal of claim 1, wherein the step of determining whether the maintaining time of the running state reaches the upper limit of the preset time threshold value comprises:
releasing the hardware resource occupied by the process automatically, when it is determined that the maintaining time of the running state reaches the upper limit of the preset time threshold value; and
maintaining the current state, when it is determined that the maintaining time of the running state does not reach the upper limit of the preset time threshold value.

6. The method for automatically releasing the resource occupied by the process in the background of the terminal of claim 5, wherein the upper limit of the preset time threshold value is set manually or automatically.

7. The method for automatically releasing the resource occupied by the process in the background of the terminal of claim 6, wherein the upper limit of the preset time threshold value is ranged from 10 minutes to 60 minutes.

8. A non-transitory storage medium, wherein the storage medium is configured to store computer programs, and the computer programs are executed to implement steps of:
determining whether the process is in a cache state when the process is transferred to the background;
releasing a hardware resource occupied by the process automatically if the process is in the cache state, wherein the hardware resource is in a system of a terminal;
determining whether the process is in a running state if the process is not in the cache state;
maintaining a current state if the process is not in the running state;
determining whether a maintaining time of the running state reaches an upper limit of a preset time threshold value if the process is in the running state;
releasing the hardware resource occupied by the process automatically if the maintaining time of the running state reaches the upper limit of the preset time threshold value; and
maintaining the current state if the maintaining time of the running state does not reach the upper limit of the preset time threshold value.

9. The non-transitory storage medium of claim 8, wherein the step of releasing the hardware resource occupied by the process automatically if the process is in the cache state comprises:
closing all or a part of monitoring of the hardware resource to which the process registers.

10. The non-transitory storage medium of claim 9, wherein the process comprises a wakelock, BLUETOOTH, GPS monitor, or WiFi.

11. The non-transitory storage medium of claim 8, wherein the step of determining whether the process is in the running state comprises:
jumping to the step of determining whether the maintaining time of the running state reaches the upper limit of the preset time threshold value, when it is determined that the process is in the running state; and
maintaining the current state, when it is determined that the process is not in the running state.

12. The non-transitory storage medium of claim 8, wherein the step of determining whether the maintaining time of the running state reaches the upper limit of the preset time threshold value comprises:
releasing the hardware resource occupied by the process automatically, when it is determined that the maintaining time of the running state reaches the upper limit of the preset time threshold value; and
maintaining the current state, when it is determined that the maintaining time of the running state does not reach the upper limit of the preset time threshold value.

13. The non-transitory storage medium of claim 12, wherein the upper limit of the preset time threshold value is set manually or automatically.

14. The non-transitory storage medium of claim 13, wherein the upper limit of the preset time threshold value is ranged from 10 minutes to 60 minutes.

15. A terminal, comprising: a processor and a memory communicating with and connected to the processor, wherein the memory is configured to store computer programs, and the processor is configured to call the computer programs in the memory to execute steps of:
determining whether the process is in a cache state when the process is transferred to the background;
releasing a hardware resource occupied by the process automatically if the process is in the cache state, wherein the hardware resource is in a system of the terminal;
determining whether the process is in a running state if the process is not in the cache state;
maintaining a current state if the process is not in the running state;
determining whether a maintaining time of the running state reaches an upper limit of a preset time threshold value if the process is in the running state;
releasing the hardware resource occupied by the process automatically if the maintaining time of the running state reaches the upper limit of the preset time threshold value; and
maintaining the current state if the maintaining time of the running state does not reach the upper limit of the preset time threshold value.

16. The terminal of claim 15, wherein the step of releasing the hardware resource occupied by the process automatically if the process is in the cache state comprises:
closing all or a part of monitoring of the hardware resource to which the process registers.

17. The terminal of claim 16, wherein the process comprises a wakelock, BLUETOOTH, GPS monitor, or WiFi.

18. The terminal of claim 15, wherein the step of determining whether the process is in the running state comprises:
   jumping to the step of determining whether the maintaining time of the running state reaches the upper limit of the preset time threshold value, when it is determined that the process is in the running state; and
   maintaining the current state, when it is determined that the process is not in the running state.

19. The terminal of claim 15, wherein the step of determining whether the maintaining time of the running state reaches the upper limit of the preset time threshold value comprises:
   releasing the hardware resource occupied by the process automatically, when it is determined that the maintaining time of the running state reaches the upper limit of the preset time threshold value; and
   maintaining the current state, when it is determined that the maintaining time of the running state does not reach the upper limit of the preset time threshold value.

20. The terminal of claim 19, wherein the upper limit of the preset time threshold value is set manually or automatically.

\* \* \* \* \*

UNITED STATES PATENT AND TRADEMARK OFFICE
CERTIFICATE OF CORRECTION

| | | |
|---|---|---|
| PATENT NO. | : 11,138,041 B2 | Page 1 of 1 |
| APPLICATION NO. | : 16/639572 | |
| DATED | : October 5, 2021 | |
| INVENTOR(S) | : Min Zhang | |

It is certified that error appears in the above-identified patent and that said Letters Patent is hereby corrected as shown below:

On the Title Page

Item (54) and in the Specification, Column 1, Line 4 Change "MEDIUM" to -- MEDIUM, --

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*